Dec. 29, 1931.  H. SONNENFELD  1,838,332
ELECTRIC CABLE
Filed Oct. 21, 1926

H. Sonnenfeld
INVENTOR

By: Mark & Clark
Attys.

Patented Dec. 29, 1931

1,838,332

UNITED STATES PATENT OFFICE

HUGO SONNENFELD, OF BRATISLAVA, CZECHOSLOVAKIA

ELECTRIC CABLE

Application filed October 21, 1926, Serial No. 143,274, and in Czechoslovakia June 25, 1926.

The price of a lead covered cable depends to a high degree upon the lead sheath and the armouring, if any. As the thickness of the lead sheath for chemical purposes and on account of mechanical strength is standardized, the cost of the cable is so much less as the surface of the lead sheath is smaller.

The current carrying capacity of a cable is increased as the internal thermal resistance of the cable is decreased. This resistance, under the same conditions for the cross section of the conductor, the kind of insulating material, and so forth, is smaller, the shorter the path which the heat produced in the conductor has to pass through in order to reach the sheath.

The present invention relates to a construction of cables in which, on the one hand, lead, armouring and insulating material is saved, by giving a special shape to the lead sheath and to the insulation. On the other hand, by the special shape of the lead sheath, the cable can be better loaded with current and greater economy of the cable so insured. It is an object of this invention to provide an improved electric cable.

Figure 1:
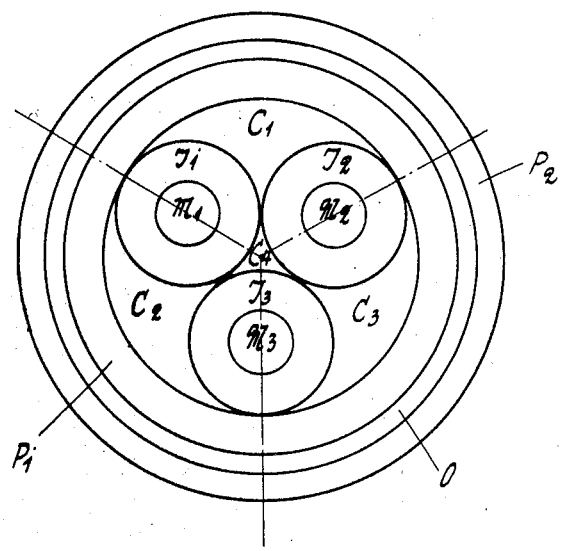
Figure 2:
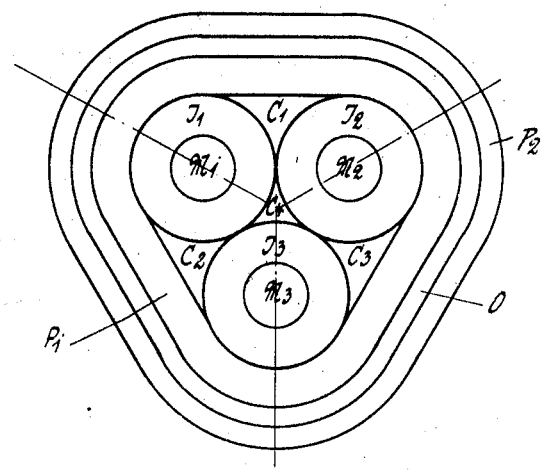

Figures 1 and 2 show by way of example how the invention can be carried out.

Figure 1 shows a three conductor cable made in accordance with the present art. In Figure 1, $M^1$, $M^2$ and $M^3$ are the conductors, $J^1$, $J^2$ and $J^3$ the insulation laid around the conductors, $C^1$, $C^2$ and $C^3$ the insulating fillers which supplement the area formed by the insulated conductors approximately to a circular cross section, and $C^4$ the insulating filler which fills up the space between the three insulated conductors in the centre of the cable. P is the belt insulation laid around the twisted conductors supplemented in the described manner to circular form, O is the lead sheath, and $P^2$ the armouring.

Figure 2 shows in cross section a cable in accordance with the invention, and in which the corresponding parts have the same reference characters as in Figure 1.

By comparing Figure 2 with Figure 1 it will be seen that the circular cross section of the lead sheath has been abandoned. The fillers $C^1$, $C^2$, $C^3$ have a smaller cross section than would be necessary to supplement the area of the three insulated conductors to a complete circular shape.

By suitably choosing the size of the area of the insulating fillers $C^1$, $C^2$, $C^3$ as well as by giving them a suitable shape, it is possible to minimize the use of material for the belt insulation $P^1$, the lead sheath O and for the armouring $P^2$, in comparison with the amount of material used now in a cable with a circular shape. Or at least it is possible to reduce to closer limits the use of material.

The minimum use of material is reached when the inside area of the belt insulation $P^1$ forms a tangential connection of the surface of the three conductors, so that the cross section of the cable has the shape of a triangle with rounded off corners, both around the insulation $P^1$ and around the lead sheath O. In such a cable construction there is a substantial saving of material. Furthermore, the surface of the lead sheath is brought closer to the cable conductors in the region near the insulating fillers $C^1$, $C^2$ and $C^3$ than is the case with the standard construction used up to now. As these are the places through which the heat of the cable escapes, the cable formed in accordance with the new invention has a smaller internal thermal resistance than a cable made in accordance with the present art, and therefore can be more heavily loaded with current. Comparing Figures 1 and 2 we can further see, that the fillers $C^1$, $C^2$ and $C^3$ in the new construction have a small area.

The insulating material has been taken out of the cross section of the cable only at those places where the insulating material is least stressed electrically. The diminution of insulation leads therefore to a further economy of manufacturing costs without reducing the value of the cable.

It is well known that cables can be made without any belt insulation for purposes where this is of advantage, as for instance cables for three phase circuits with grounded neutral. The invention of course can be used for all types of such cables also. In this case the lead sheath itself presses tangentially and closely, directly on the three insulated conductors.

Besides this, the present invention is not limited only to three conductor cables but can be used for cables which contain more than three conductors. In such other constructions the insulating fillers supplement the area of the cable cross section to a more or less rounded off polygonal shape.

In applying an extruded sheath, for example lead, to cable made in accordance with the present invention, the extruding press is provided with suitably formed dies and counter-dies, and the cable drums before and behind the lead press can be rotated in correspondence with the twisting of the conductors. Alternatively the die and counter-die in the lead press may be rotated during the lead sheathing in correspondence with the twisting.

In the following a further method is described of sheathing the stranded conductors with a lead sheath of non-circular cross section. The non-rotating die and counter-die in the press are made of circular shape. The circumference of the circular counter-die is made exactly the same size as the circumference of the inner surface which the lead sheath will have in the complete cable. The diameter of the circular opening of the die is chosen in accordance to the desired thickness of the lead sheath.

During the sheathing a lead cylinder with circular cross section will first be formed. This cylinder, however, presses itself immediately to the shape and circumference of the multi-conductor cable. If the circular circumference of the lead sheath is the same as the circumference of the multi-conductor cable, the lead sheath will press itself closely to the multi-conductor cable and take its shape.

What I claim is:

1. A multiple conductor, high voltage electric power cable of increased current-carrying capacity and reduced weight comprising, in combination, three individually insulated substantially round conductors twisted together to form a cable, fibrous insulating material filling the outer spaces between said insulated conductors radially of the cable in any transverse section only to lines tangent to adjacent insulating conductors, and an enclosing wall comprising an outer impervious sheath around said insulated conductors and fibrous filling material conforming closely to the overall contour thereof to provide shorter and lower resistance heat transfer paths from the conductors to the exterior of the sheath with resulting increased current-carrying capacity as compared to a similar cable whose outer sheath is circular in cross section.

2. A multiple conductor, high voltage electric power cable having reduced thermal resistance from the cores to the outer sheath comprising, in combination, three individually insulated substantially round conductors twisted together, fibrous insulating material filling the outer spaces between said insulated conductors radially of the cable in any transverse section only to lines tangent to adjacent insulated conductors, and a wall comprising an outer impervious sheath enclosing said insulated conductors and fibrous filling material conforming closely to the overall contour thereof and having direct heat transfer contact with approximately one third of the sum of the external surfaces of all of the insulated conductors.

3. A multiple conductor, high voltage electric power cable having reduced thermal resistance from the conductors to the outer sheath comprising, in combination, three or more individually insulated substantially round conductors twisted together, fillers of fibrous insulating material in the outer spaces between said insulated conductors, the maximum dimension of any such filler radially of the cable being no greater than the radius of one of the insulated conductors, and a wall comprising an outer impervious sheath enclosing said insulated conductors and fibrous filling material and in transverse section perpendicular to the axis of the cable conforming closely to the circular contour of the individually insulated conductors throughout arcs defined by lines tangent to the outer surfaces of adjacent insulated conductors, and between such arcs conforming to the said tangential lines.

In testimony whereof I affix my signature.

HUGO SONNENFELD.